United States Patent [19]

Kemble

[11] 4,328,387

[45] May 4, 1982

[54] FAIL-SAFE THERMOSTATICALLY CONTROLLED CIRCUIT FOR USE IN APPARATUS FOR MELTING AND DISPENSING THERMOPLASTIC MATERIAL

[75] Inventor: Richard E. Kemble, Lilburn, Ga.

[73] Assignee: Nordson Corporation, Amherst, Ohio

[21] Appl. No.: 131,692

[22] Filed: Mar. 19, 1980

[51] Int. Cl.³ .............................................. H05B 1/02
[52] U.S. Cl. .................................... 219/517; 219/417;
337/182; 337/183; 337/407; 361/104; 222/146 HE
[58] Field of Search ..................... 13/24; 337/182, 183, 337/407; 361/104, 54; 219/421, 517; 222/146 R, 146 H, 146 HE

[56] References Cited

U.S. PATENT DOCUMENTS

| Re. 28,822 | 5/1976 | Fritts | 361/104 |
|---|---|---|---|
| 1,528,053 | 3/1925 | Hands | 13/24 |
| 1,966,466 | 7/1934 | Smalley | 337/182 |
| 2,223,729 | 12/1940 | Kleindienst et al. | |
| 3,277,276 | 10/1966 | Nichol et al. | 219/421 |
| 3,377,466 | 4/1968 | Paulsen | 219/421 |
| 3,531,023 | 9/1970 | Mercer | 222/146 |
| 3,548,156 | 12/1970 | Davey | 219/499 |
| 3,708,652 | 1/1973 | Salway-Waller | 219/505 |
| 3,792,801 | 2/1974 | Baker et al. | 222/146 HE |
| 3,981,416 | 9/1976 | Scholl | 222/146 R |
| 4,075,678 | 2/1978 | Levinn | 361/104 |

FOREIGN PATENT DOCUMENTS 154166 12/1920 United Kingdom ................ 337/407

Primary Examiner—B. A. Reynolds
Assistant Examiner—Bernard Roskoski
Attorney, Agent, or Firm—Wood, Herron & Evans

[57] ABSTRACT

A fail-safe thermostatically controlled circuit is disclosed for use in high-throughput thermoplastic material melting and dispensing apparatus including a hopper into which solid thermoplastic material is deposited for feeding the thermoplastic material to a grid melter which melts the thermoplastic material whereupon the molten thermoplastic material flows from the grid melter to a reservoir from which the molten thermoplastic material is pumped to an applicator or dispenser. Both the grid melter and the reservoir are preferably heated by electrical resistance heaters energized by separate fail-safe thermostatically controlled circuits. Each fail-safe thermostatically controlled circuit includes a manually adjustable thermostat for sensing the temperature of the molten thermoplastic material in order to connect a high voltage and current power source through a fusible element included in fail-safe circuitry to the electrical resistance heaters for energizing the electrical resistance heaters when the temperature of the molten thermoplastic material is below a preselected thermostat temperature setting. The fail-safe circuitry also includes a shut-off temperature detector for sensing the temperature of the molten thermoplastic material in order to energize a heat generating element for melting the fusible element if the temperature of the molten thermoplastic material reaches a predetermined shut-off temperature which is above the preselected thermostat temperature setting, thereby disconnecting the power source from the electrical resistance heaters.

10 Claims, 5 Drawing Figures

FAIL-SAFE THERMOSTATICALLY CONTROLLED CIRCUIT FOR USE IN APPARATUS FOR MELTING AND DISPENSING THERMOPLASTIC MATERIAL

BACKGROUND OF THE INVENTION

This invention relates to thermostatically controlled circuits for energizing electrical resistance heaters and, more particularly, to thermostatically controlled circuits for energizing electrical resistance heaters in an apparatus for melting and dispensing thermoplastic material. Specifically, the invention is directed to a fail-safe thermostatically controlled circuit for energizing electrical resistance heaters in high-throughput thermoplastic material melting and dispensing apparatus.

Thermoplastic material is commonly used today as an adhesive. Consider, for example, the use of thermoplastic material as an adhesive for constructing packages. An article is initially placed in a partially erected carton. Next, molten thermoplastic material is applied to the carton flaps which are then folded for adhesively joining the flaps together so that the article is sealed in the carton once the molten thermoplastic material solidifies. Hot melt adhesives are also used during the assembly of many products, such as automobiles, electronic components, electrical equipment, appliances, furniture, aircraft subassemblies, and products wherein a metal-to-metal bond is needed.

Thermoplastic material is usually supplied in the form of solid chunks which must be melted to the molten state before the thermoplastic material is used. Various types of apparatus are known for melting solid thermoplastic material to the molten state and for dispensing the molten thermoplastic material to an applicator or dispenser. One such apparatus suitable for melting and dispensing thermoplastic material is shown in U.s. Pat. No. 3,981,416 which is owned by the assignee of the present invention, and the disclosure of that patent is incorporated as if fully set forth herein.

The thermoplastic material melting and dispensing apparatus shown in U.S. Pat. No. 3,981,416 includes a hopper into which solid thermoplastic material is deposited. The hopper feeds the solid thermoplastic material to a grid melter. Electrical resistance heaters heat the grid melter for melting the thermoplastic material. The molten thermoplastic material flows through the grid melter to a reservoir. Electrical resistance heaters heat the reservoir for maintaining the thermoplastic material in the molten state. The molten thermoplastic material is pumped from the reservoir to an applicator or dispenser.

It is desirable to rapidly melt the solid thermoplastic material and to maintain only a small reservoir of molten thermoplastic material in order to reduce the length of time during which molten thermoplastic material is exposed to oxygen and heat so that degradation of the thermoplastic material is minimized. In order to rapidly bring the grid melter up to a temperature for melting the solid thermoplastic material and to rapidly bring the reservoir up to a temperature for maintaining the thermoplastic material in a molten state, the maximum temperature of the electrical resistance heaters which pass through the grid melter and which are disposed in the walls of the reservoir are capable of heating the grid melter and the reservoir to a temperature which generally exceeds the flash point of the thermoplastic material. The maximum temperature of the grid melter and the reservoir, for example, may be on the order of 800° F., whereas the flash point of the thermoplastic material may be 650° F. Consequently, thermostatically controlled circuits are used for energizing the electrical resistance heaters which pass through the grid melter and which are disposed in the walls of the reservoir in order to rapidly bring the grid melter up to the temperature for melting the solid thermoplastic material and to rapidly bring the reservoir up to the temperature for maintaining the thermoplastic material in a molten state but to prevent the temperature of the grid melter or the reservoir from reaching the flash point of the thermoplastic material.

It is generally desirable to operate the grid melter and the reservoir at different temperatures. In the case of many thermoplastic materials, solid thermoplastic material melts at one temperature, for example, 425° F., and freezes at a lower temperature, such as 375° F. In the case of such thermoplastic materials, it is preferable to operate the grid melter at a temperature slightly above the melting temperature and the temperature of the reservoir slightly above the freezing temperature. As a result, degradation of molten thermoplastic material in the reservoir is minimized. Therefore, separate thermostatically controlled circuits are provided for energizing the electrical resistance heaters which pass through the grid melter and the electrical resistance heaters which are disposed in the walls of the reservoir.

The thermostatically controlled circuits generally include thermostats of either the bimetal or the bulb type. One thermostat is located near the grid melter and another thermostat is located near the reservoir for sensing the temperature of the molten thermoplastic material. Each thermostat in turn energizes a contactor for connecting a power source to the electrical resistance heaters when the temperature of the molten thermoplastic material is below a preselected thermostat temperature setting.

In the case where bimetal thermostats are used, there is a possibility that the thermostats can fail, for example, the contacts of either bimetal thermostat can weld closed. The use of bulb thermostats is preferred since such thermostats per se are inherently fail-safe, that is, the gas within either bulb thermostat vents off if the bulb ruptures. Nevertheless, the bulbs generally actuate microswitches which in turn energize the contactors for connecting the power source to the electrical resistance heaters. There is a possibility that the microswitches can fail, for example, the contacts of a microswitch can weld closed. Furthermore, in either the case where bimetal thermostats are used or the case where bulb thermostats are used, there is a possibility that the contactors can fail, for example, the contacts of a contactor can weld closed or the spring which is used for opening the contacts when the contactor is de-energized can break. If a failure occurs, the electrical resistance heaters continue to be energized by the power source after the preselected thermostat temperature setting is reached. As a result, the temperature of the grid melter or the reservoir heated by the electrical resistance heaters rises above the preselected thermostat temperature setting toward the flash point of the thermoplastic material, thereby creating a risk of fire or explosion.

In view of the recognized failure problems, various fail-safe circuits have been proposed for avoiding the risk of fire or explosion if the thermostatically controlled circuit fails. However, fail-safe circuits heretofore used have the unfortunate limitation that they cannot be used in conjunction with thermostatically controlled circuits for the grid melter and the reservoir of high-throughput apparatus for melting and dispensing thermoplastic material which are energized at a high voltage and current.

Generally, the fail-safe circuits heretofore used in thermoplastic material melting and dispensing apparatus can be classified as being either manually resettable or disposable. Known manually resettable fail-safe circuits have a form similar to thermal overload circuits generally used in small electrical motors as shown in U.S. Pat. No. 2,223,729, for example. Disposable fail-safe circuits, on the other hand, include fuses having contacts joined by eutectic solder. A common characteristic of these fail-safe circuits is that current flows from the power source through the manually resettable or disposable element to the electrical resistance heaters. However, the manually resettable and disposable elements are capable of operating for prolonged periods of time without failure only at a nominal voltage and current, such as 120 volts and 10 amps. Consequently, fail-safe circuits heretofore used have been restricted to apparatus for melting and dispensing thermoplastic material having electrical resistance heaters energized by a 120 volt, 10 amp or other nominal power source. High throughput is not achievable under such conditions, that is, high throughput requires larger electrical resistance heaters energized by a high voltage and current, such as 240 volts and 15 amps. Heretofore, a fail-safe thermostatically controlled circuit for use in high-throughput thermoplastic material melting and dispensing apparatus has not been available so far as is known.

SUMMARY OF THE INVENTION

It is the primary objective of the invention to provide a fail-safe thermostatically controlled circuit for use in a high-throughput apparatus for melting and dispensing thermoplastic material. It is also an objective to provide fail-safe circuitry which can be easily incorporated into the thermostatically controlled circuit or circuits which energize the electrical resistance heaters in thermoplastic melting and dispensing apparatus. It is a further objective to provide relatively low-cost fail-safe circuitry for thermostatically controlled circuits.

The invention provides a fail-safe thermostatically controlled circuit for use in a high-throughput apparatus for melting and dispensing thermoplastic material. The thermoplastic material melting and dispensing apparatus includes a hopper into which solid thermoplastic material is deposited. The hopper feeds the solid thermoplastic material to a means heated by at least one electrical resistance heater for melting the solid thermoplastic material and maintaining the thermoplastic material in a molten state until the molten thermoplastic material is pumped to an applicator or dispenser. Preferably, the hopper feeds the solid thermoplastic material to a grid melter which is heated by one or more electrical resistance heaters for melting the solid thermoplastic material. The molten thermoplastic material preferably flows from the grid melter to a reservoir which is also heated by one or more electrical resistance heaters for maintaining the thermoplastic material in a molten state until the molten thermoplastic material is pumped to the applicator or dispenser.

In accordance with the invention, the at least one electrical resistance heater included in the means for melting the solid thermoplastic material and maintaining the thermoplastic material in a molten state is energized by a thermostatically controlled circuit which includes fail-safe circuitry. The fail-safe thermostatically controlled circuit includes a manually adjustable thermostat for sensing the temperature of the molten thermoplastic material in order to connect a high voltage and current power source through a fusible element included in the fail-safe circuitry to the electrical resistance heaters for energizing the electrical resistance heaters when the temperature of the molten thermoplastic material is below a preselected thermostat temperature setting. The fail-safe circuitry also includes a means for melting the fusible element if the temperature of the molten thermoplastic material reaches a predetermined shut-off temperature which is above the preselected thermostat temperature setting. The means for melting the fusible element preferably comprises a shut-off temperature detector in the form of a thermostat which preferably has normally open contacts which are closed when the temperature of the molten thermoplastic material reaches the predetermined shut-off temperature. The shut-off temperature detector preferably energizes a heat generating element, such as a resistor, which is connected through the contacts of the shut-off temperature detector to the power source, for melting the fusible element when the predetermined shut-off temperature is reached. Preferably, one fail-safe thermostatically controlled circuit is provided for energizing the electrical resistance heaters which pass through the grid melter, and another fail-safe thermostatically controlled circuit is provided for energizing the electrical resistance heaters which are disposed in the walls of the reservoir.

In a preferred embodiment of the invention, the heat generating element included in the fail-safe circuitry comprises a wire resistor wrapped around a ceramic tube. The wire resistor and the ceramic tube are encapsulated in epoxy or other insulative material. The fusible element is then placed within the ceramic tube. By this arrangement, the resistor is electrically insulated and is electrically isolated from the fusible element. Also, air can circulate through the ceramic tube for dissipating heat which is generated internally by current flowing through the fusible element during operation of the fail-safe thermostatically controlled circuit, thereby avoiding melting of the fusible element due to internally generated heat and preventing nuisance tripping.

The invention provides a fail-safe thermostatically controlled circuit for a high-throughput apparatus for melting and dispensing thermoplastic material. The fusible element included in the fail-safe circuitry allows use of a high voltage and current, for example, 240 volts and 15 amps, for energizing the at least one electrical resistance heater included in the means for melting the solid thermoplastic material and maintaining the thermoplastic material in a molten state so as to overcome the limitation of heretofore used fail-safe circuits which cannot be used at higher than 120 volts and 10 amps. The fail-safe circuitry of the invention, including the fusible element, shut-off temperature sensor, and heat generating element, comprises very effective fail-safe circuitry which can be constructed at relatively low cost and easily incorporated into thermostatically controlled circuits of high-throughput thermoplastic material melting and dispensing apparatus.

BRIEF DESCRIPTION OF THE DRAWINGS

The above and other features of the fail-safe thermostatically controlled circuit of the invention for energizing the electrical resistance heaters included in an apparatus for melting and dispensing thermoplastic material will be better understood and the concomitant advantages will be better appreciated by those skilled in the art after a consideration of the description which appears below in connection with the accompanying drawings. In the drawings:

FIG. 3 is a cross-sectional view taken along line 3—3 in FIG. 1;

The fail-safe thermostatically controlled circuit of the invention has been found especially useful in thermoplastic material melting and dispensing apparatus such as that generally indicated by the numeral 10 in FIG. 1. As shown in FIGS. 1–3, the apparatus for melting and dispensing thermoplastic material includes a housing 11 in which there is located a hopper 12, a grid melter 13, a reservoir 14, a pump 15, and a manifold block 16.

As shown in FIG. 3, solid thermoplastic material 17 in the form of chunks is deposited in the top of hopper 12 through a removable cover 18. Hopper 12 comprises a vertical tube 19, the bottom 20 of which is open. Solid thermoplastic material 17 deposited in vertical tube 19 of hopper 12 is fed through bottom 20 of the hopper into contact with the top surface of grid melter 13.

Figure 1:
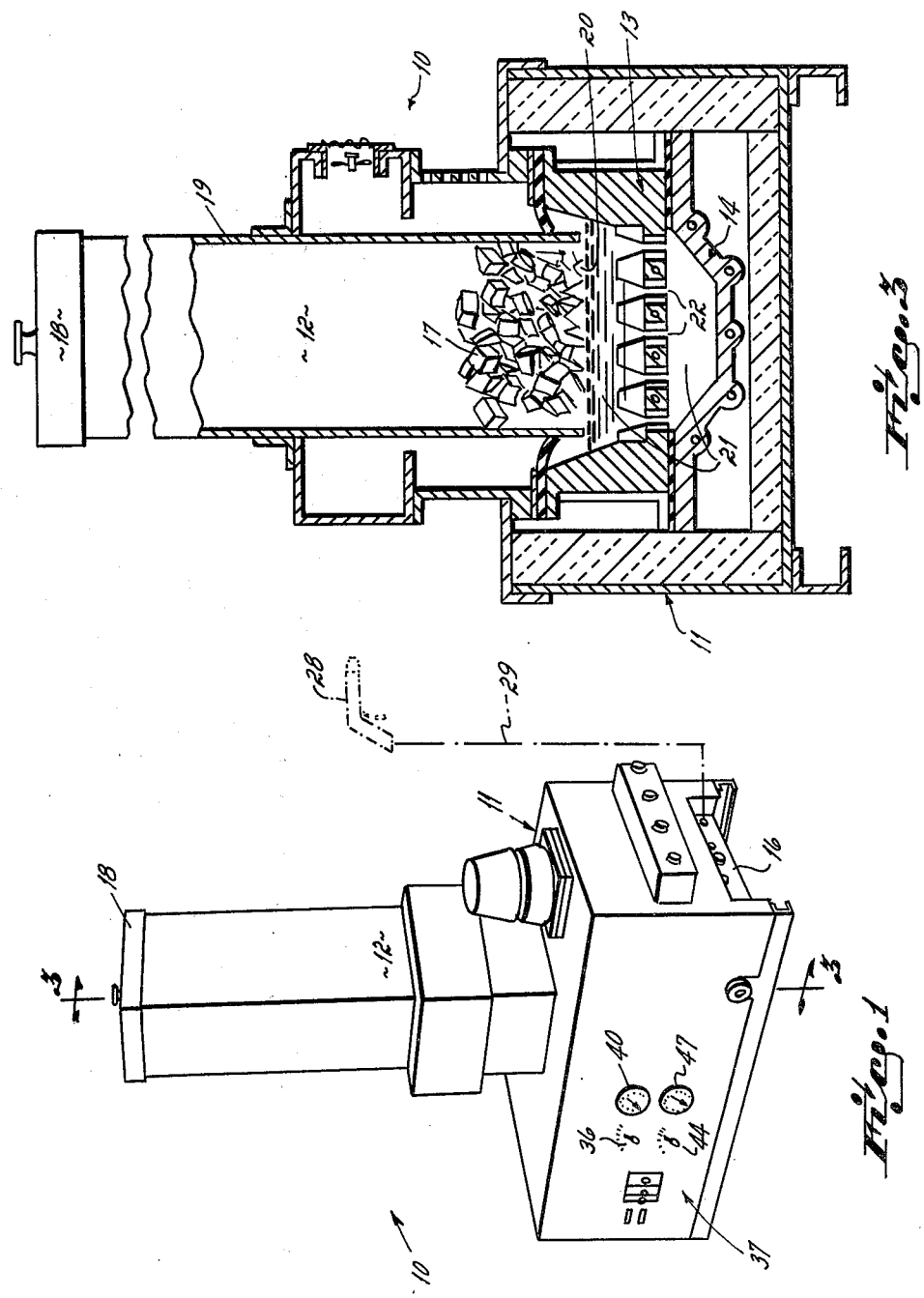
FIG. 1 is a perspective view of a thermoplastic material melting and dispensing apparatus incorporating the fail-safe thermostatically controlled circuit of the invention.

Grid melter 13 is heated as will be described later so that contact of solid thermoplastic material 17 with the top surface of the grid melter causes the solid thermoplastic material to melt, thereby converting the solid thermoplastic material into a molten state. Molten thermoplastic material 21 then flows downwardly through passageways 22 in grid melter 13 to reservoir 14 located immediately beneath the grid melter.

Figure 2:
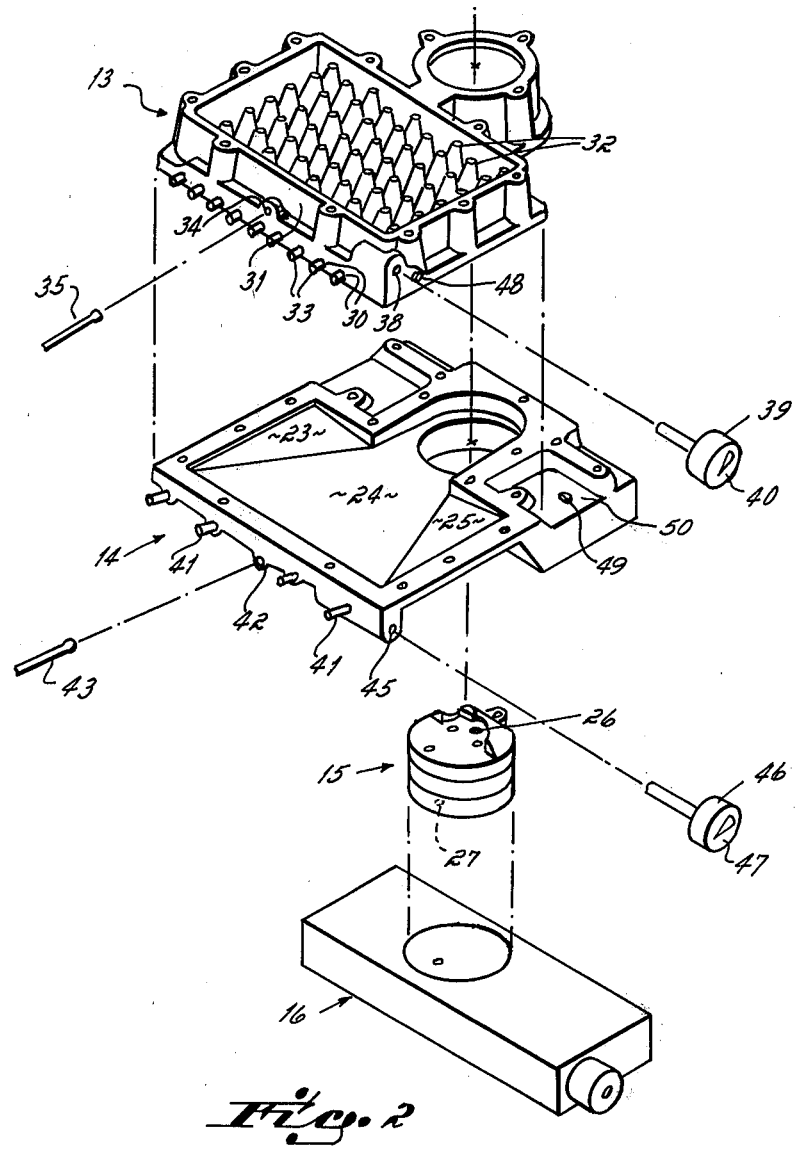
FIG. 2 is an exploded perspective view of a portion of the apparatus for melting and dispensing thermoplastic material shown in FIG. 1.

As shown in FIG. 2, reservoir 14 has sloping walls 23, 24, and 25 which direct molten thermoplastic material 21 toward the inlet 26 of pump 15. Molten thermoplastic material 21 is pumped through the outlet 27 of pump 15 into manifold block 16 from whence the molten thermoplastic material is directed to one or more conventional applicators or dispensers 28 via hoses or conduits 29 as shown in FIG. 1. Further details of the thermoplastic material melting and dispensing apparatus shown in FIGS. 1–3 appear in aforementioned U.S. Pat. No. 3,981,416.

One or more bores 30 extend through a wall 31 as well as through the base portion of each row of grid melter protrusions 32 included in grid melter 13. An electrical resistance heater 33 is mounted within each bore 30 so that an electrical resistance heater extends into and through wall 31 and the base portion of each row of grid melter protrusions 32. On the end of each electrical resistance heater 33 which passes through grid melter 13, there is an electrical contact (not shown) by means of which the individual electrical resistance heaters may be electrically connected to the fail-safe thermostatically controlled circuit of the invention which will be described later. There is also a bore 34 which extends through wall 31 of grid melter 13 within which a grid melter thermostat 35, preferably a bulb thermostat, is mounted for controlling the temperature of the grid melter as described later.

Grid melter thermostat 35 is located in such a position as to faithfully sense the temperature of grid melter 13. Grid melter thermostat 35 is used for maintaining the temperature of grid melter 13 at a preselected thermostat temperature setting which can be manually adjusted by means of a grid melter temperature dial 36 on a control panel 37 of housing 11 as shown in FIG. 1. There is preferably also a transverse bore 38 in wall 31 of grid melter 13. Transverse bore 38 accommodates a grid melter temperature measuring guage 39 of conventional structure, the front face 40 of which is located upon control panel 37 of housing 11.

Preferably, as shown in FIG. 2, there are also two identical U-shaped electrical resistance heaters 41 molded within walls 23–25 of reservoir 14. Electrical resistance heaters 41 are positioned on opposite sides of pump 15 for assuring uniform heating of the pump and manifold block 16. On the end of each electrical resistance heater 41 which is disposed in walls 23–25 of reservoir 14 there is an electrical contact (not shown) by means of which the individual electrical resistance heaters may be electrically connected to the fail-safe thermostatically controlled circuit of the invention which will be described later. There is also a bore 42 molded in wall 24 of reservoir 14 within which a reservoir thermostat 43, preferably a bulb thermostat, is mounted for controlling the temperature of the reservoir as described later.

Reservoir thermostat 43 is located in such a position as to faithfully sense the temperature of reservoir 14. Reservoir thermostat 43 is used for maintaining the temperature of reservoir 14 at a preselected thermostat temperature setting which can be manually adjusted by means of a reservoir temperature dial 44 on control panel 37 of housing 11 as shown in FIG. 1. There is preferably also a transverse bore 45 in wall 25 of reservoir 14. Transverse bore 45 accommodates a reservoir temperature measuring guage 46 of conventional structure, the front face 47 of which is located upon control panel 37 of housing 11.

In accordance with the invention, a grid melter shut-off temperature detector 48, preferably a thermostat having normally open contacts, is located on grid melter 13 at a position such as shown in FIG. 2 chosen for faithfully sensing the temperature of molten thermoplastic material 21 in the region of the grid melter. Also, a reservoir shut-off temperature detector 49, preferably a thermostat having normally open contacts, is located on a base portion 50 of reservoir 14 as shown in FIG. 2 chosen for faithfully sensing the temperature of molten thermoplastic material 21 in the reservoir.

Figure 4:
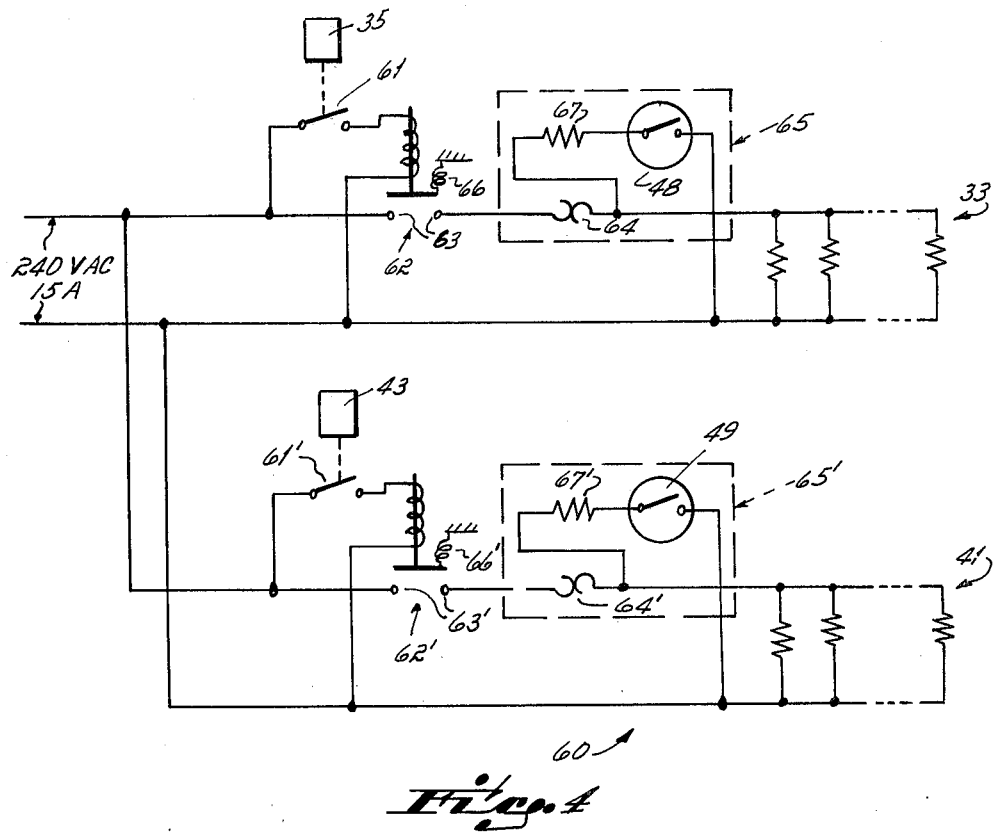
FIG. 4 is a schematic circuit diagram of the fail-safe thermostatically controlled circuit of the invention.

The preferred embodiment of the fail-safe thermostatically controlled circuit for energizing electrical resistance heaters 33 which heat grid melter 13 and the electrical resistance heaters 41 which heat reservoir 14 comprising the means for melting the thermoplastic material and maintaining the thermoplastic material in a molten state is shown in FIG. 4. As mentioned earlier, one fail-safe thermostatically controlled circuit is preferably provided for electrical resistance heaters 33 which pass through grid melter 13, and another fail-safe thermostatically controlled circuit is preferably provided for energizing electrical resistance heaters 41 which are disposed in walls 23-25 of reservoir 14. In operation, grid melter thermostat 35 is generally set at the melting temperature or slightly above the melting temperature of thermoplastic material 17. Reservoir thermostat 43 is set at a temperature which will maintain molten thermoplastic material 21 in the molten state with a minimum of thermal degradation. However, it is contemplated that there may be a single fail-safe thermostatically controlled circuit for energizing the electrical resistance heaters in both the grid melter and the reservoir, for example, in a case where the melting temperature of the solid thermoplastic material and the freezing temperature of molten thermoplastic material are substantially the same. It is also contemplated that the reservoir may not need electrical resistance heaters. The fail-safe thermostatically controlled circuit shown in FIG. 4 can be easily modified for use in any of the above-enumerated situations.

The fail-safe thermostatically controlled circuit of the invention, indicated generally by the numeral 60 in FIG. 4, which is contained in housing 11 behind control panel 37, connects a high voltage and current power source, such as a 240 volt, 15 amp alternating current power source, to electrical resistance heaters 33 which pass through grid melter 13 and electrical resistance heaters 41 which are disposed in walls 23-25 of reservoir 14. Grid melter thermostat 35 mounted in bore 34 of grid melter 13, which is manually adjusted by means of grid melter temperature dial 36 for setting the desired operating temperature of grid melter 13, and reservoir thermostat 43 mounted in bore 42 of reservoir 14, which is manually adjusted by means of reservoir temperature dial 44 for setting the desired operating temperature of reservoir 14, normally cycle on and off for maintaining the grid melter and the reservoir at the desired temperatures, such as 400° F. and 375° F., respectively. When the temperature of grid melter 13 is below the preselected grid melter thermostat temperature setting, grid melter thermostat 35 preferably closes a microswitch 61. Similarly, when the temperature of reservoir 14 is below the preselected reservoir thermostat temperature setting, reservoir thermostat 43 preferably closes a microswitch 61'. When microswitch 61 or 61' is closed, the coil of a contactor 62 or 62' is connected to the power source.

When the coil of contactor 62 or 62' is connected to the power source, the coil of contactor 62 or 62' is energized for closing normally open contacts 63 or 63'. When contacts 63 or 63' are closed, the power source is connected through a fusible element 64 or 64' included in fail-safe circuitry 65 or 65' to electrical resistance heaters 33 which pass through grid melter 13 or electrical resistance heaters 41 which are disposed in walls 23-25 of reservoir 14 for heating the grid melter or the reservoir.

When the temperature of grid melter 13 reaches the preselected grid melter thermostat temperature setting, grid melter thermostat 35 opens microswitch 61, thereby de-energizing the coil of contactor 62 so that contacts 63 are opened. Similarly, when the temperature of reservoir 14 reaches the preselected reservoir thermostat temperature setting, reservoir thermostat 43 opens microswitch 61', thereby de-energizing the coil of contactor 62' so that contacts 63' are opened. When contacts 63 or 63' are opened, the power source is disconnected from electrical resistance heaters 33 which pass through grid melter 13 or electrical resistance heaters 41 which are disposed in walls 23-25 of reservoir 14. If, however, for some reason microswitch 61 or 61' becomes welded closed or contacts 63 or 63' of contactor 62 or 62' become welded closed or spring 66 or 66' of contactor 62 or 62' breaks or some other failure occurs, the power source could remain connected through fusible element 64 or 64' to electrical resistance heaters 33 or 41.

If a failure occurs, electrical resistance heaters 33 which pass through grid melter 13 will continue to heat the grid melter beyond the preselected grid melter thermostat temperature setting toward the predetermined grid melter shut-off temperature, for example, 500° F., where upon grid melter shut-off temperature detector 48 is actuated; or electrical resistance heaters 41 which are disposed in walls 23-25 of reservoir 14 will continue to heat the reservoir beyond the preselected reservoir thermostat temperature setting toward the predetermined reservoir shut-off temperature, for example, 500° F., where upon reservoir shut-off temperature detector 49 is actuated.

As shown in FIG. 4, grid melter shut-off temperature detector 48 is preferably a thermostat having normally open contacts which are closed when grid melter 13 reaches the predetermined grid melter shut-off temperature, and reservoir shut-off temperature detector 49 is preferably a thermostat having normally open contacts which are closed when the reservoir reaches the predetermined reservoir shut-off temperature. If the predetermined grid melter shut-off temperature is reached, the contacts of grid melter shut-off temperature detector 48 are closed, and, if the predetermined reservoir shut-off temperature is reached, the contacts of reservoir shut-off temperature detector 49 are closed. When the contacts of grid melter shut-off temperature detector 48 are closed, a heat generating element 67, such as an eight watt, 3000 ohm resistor, is connected to the power source, and, when the contacts of reservoir shut-off temperature detector 49 are closed, a heat generating element 67', such as an eight watt, 3000 ohm resistor, is connected to the power source. The heat generated by heat generating element 67 melts fusible element 64, thereby disconnecting electrical resistance heaters 33 which pass through grid melter 13 from the power source, and the heat generated by heat generating element 67' melts fusible element 64', thereby disconnecting electrical resistance heaters 41 from the power source.

Fail-safe circuitry 65 or 65', which includes fusible element 64 or 64', shut-off temperature detector 48 or 49, and heat generating element 67 or 67', permanently disconnects the power source from the electrical resistance heaters 33 which pass through grid melter 13 or electrical resistance heaters 41 which are disposed in walls 23-25 of reservoir 14, that is, fail-safe circuitry 65 or 65' is not manually resettable. In order to be able to re-energize electrical resistance heaters 33 or 41, fusible element 64 or 64' must be replaced.

Figure 5:
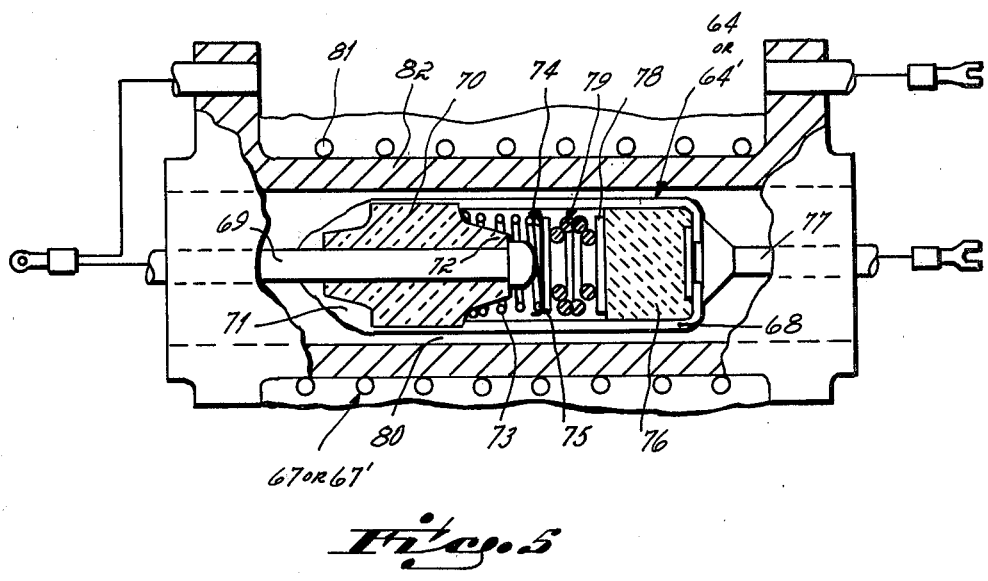
FIG. 5 is a detailed view of several elements of the fail-safe circuitry in accordance with a preferred embodiment of the invention.

The preferred embodiment of the fusible element 64 or 64' and heat generating element 67 or 67' is shown in FIG. 5. Fusible element 64 or 64' includes a casing 68. A lead 69 is mounted in an insulator bushing 70 held in casing 68 by sealing compound 71. Insulator bushing 70 has a nose portion 72 for retaining a trip spring 73. Trip spring 73 bears against a star contact 74 which is in contact with a first conductive disc 75. Casing 68 holds thermal pellets 76 which are contained between a lead 77 and a second conductive disc 78. A compression spring 79 is sandwiched between discs 75 and 78 and establishes continuity between lead 69 and lead 77 through star contact 74, disc 75, compression spring 79, disc 78, and thermal pellets 76. Fusible element 64 or 64' may be a Microtemp ® thermal cutoff from the 4000 series manufactured by Micro Devices Division, Emerson Electric Company of Dayton, Ohio.

As shown in FIG. 5, fusible element 64 or 64' is preferably disposed in a ceramic tube 82 in such a way that there is an annular air passage 80 between fusible element 64 or 64' and ceramic tube 82. The purpose of annular air passage 80 is for allowing air to circulate over the surface of fusible element 64 or 64' for dissipating heat generated internally by current flowing through the fusible element, that is, from lead 69 through star contact 74, disc 75, compression spring 79, disc 78, and thermal pellets 76 to lead 77. By providing annular air passage 80, nuisance tripping due to melting of thermal pellets 76 in fusible element 64 or 64' due to internally generated heat is avoided. Heat generating element 67 or 67' preferably comprises a resistive wire 81 wound around the outside of ceramic tube 82. Resistive wire 81 is first wound around ceramic tube 82 and then encapsulated in epoxy or other electrically insulative material before fusible element 64 or 64' is placed in the ceramic tube. As a result, resistive wire 81 is electrically insulated as well as being electrically isolated from fusible element 64 or 64' by the encapsulation and ceramic tube 82. With reference to FIGS. 4 and 5, if the contacts of grid melter shut-off temperature detector 48 or the contacts of reservoir shut-off temperature detector 49 are closed because the temperature of grid melter 13 reaches the predetermined grid melter shut-off temperature or the temperature of reservoir 14 reaches the predetermined reservoir shut-off temperature, heat generating element 67 or 67' is connected to the power source and generates heat which causes thermal pellets 76 in fusible element 64 or 64' to melt so that trip spring 73 pushes star contact 74 and disc 75 away from lead 69, thereby disconnecting the power source from electrical resistance heaters 33 which pass through grid melter 13 or electrical resistance heaters 41 which are disposed in walls 23-25 of reservoir 14.

The invention provides a fail-safe thermostatically controlled circuit for a high-throughput apparatus for melting and dispensing thermoplastic material. The fusible element included in the fail-safe circuitry allows use of a high voltage and current, for example, 240 volts and 15 amps, for energizing the electrical resistance heaters included in the means for melting the solid thermoplastic material and maintaining the thermoplastic material in a molten state. The fail-safe circuitry of the invention, including the fusible element, shut-off temperature sensor, and heat generating element, comprises very effective fail-safe circuitry which can be constructed at relatively low cost and easily incorporated into thermostatically controlled circuits of high-throughput apparatus for melting and dispensing thermoplastic material.

A preferred embodiment of the fail-safe thermostatically controlled circuit of the invention has been described by way of example and not by way of limitation. Various modifications of the fail-safe thermostatically controlled circuit have been mentioned, and other modifications may appear to those skilled in the art without departing from the spirit of the invention. In order to ascertain the true scope of the invention, reference should be made to the appended claims.

I claim:

1. An apparatus for melting and dispensing thermoplastic material comprising;
    means heated by an electrical heater for melting solid thermoplastic material and maintaining said thermoplastic material in a molten state until the molten thermoplastic material is dispensed;
    a thermostatically controlled circuit for connecting a high voltage and current power source to said electrical resistance heater if the temperature of said molten thermoplastic material is below a preselected thermostat temperature setting, said thermostatically controlled circuit including,
    a fusible element through which said power source is connected to said electrical resistance heater;
    melting means for melting said fusible element if the temperature of said molten thermoplastic material reaches a predetermined shut-off temperature;
    said melting means comprising a resistive wire in thermal contact with a ceramic tube within which said fusible element is mounted, said resistive wire being connected to a power source when the temperature of said molten thermoplastic material reaches said predetermined shut-off temperature, and
    an air flow through passage surrounding said fusible element within said ceramic tube for allowing air to circulate over said fusible element, thereby dissipating heat generated internally by current flowing through said fusible element so that nuisance tripping is avoided.

2. An apparatus for heating a substance, said apparatus including an electrical resistance heater for heating said substance, a fail-safe thermostatically controlled circuit for energizing said electrical resistance heater, comprising:
    a ceramic tube;
    a fusible element mounted in said ceramic tube;
    a thermostat for connecting a high voltage and current power source to said electrical resistance heater through said fusible element if the temperature of said substance is below a preselected thermostat temperature setting;
    a resistive wire in thermal contact with said ceramic tube;
    a shut-off temperature detector for sensing the temperature of said substance, said shut-off temperature detector causing said resistive wire to be connected to said power source if said substance reaches a predetermined shut-off temperature so that said resistive wire generates heat for melting said fusible element, thereby disconnecting said power source from said electrical resistance heater; and
    an air flow through passage surrounding said fusible element within said ceramic tube for allowing air to circulate over said fusible element, thereby dissipating heat generated internally by current flowing through said fusible element so that nuisance tripping is avoided.

3. An apparatus for melting and dispensing thermoplastic material including melting means heated by at least one electrical resistance heater for melting solid thermoplastic material and maintaining said thermoplastic material in a molten state until the molten thermoplastic material is dispensed, and a control circuit including a first thermostat connecting a high voltage and current power source to said electrical resistance heater if the temperature of said molten thermoplastic material is below a preselected first thermostat temperature setting and shutting off the flow of electrical power to said electrical resistance heater when said molten thermoplastic material reaches the temperature of said first thermostat temperature setting, said control circuit further comprising:
  (a) a fusible element through which said power source is connected to said electrical resistance heater; and
  (b) means including a second thermostat responsive to a predetermined shut-off temperature substantially higher than the shut-off temperature of said first thermostat for melting said fusible element if the temperature of said molten thermoplastic material reaches said substantially higher predetermined shut-off temperature, said means for melting said fusible element comprising a heat generating means for generating heat, said second thermostat causing said heat generating means to be connected to said power source when said molten thermoplastic material reaches said substantially higher predetermined shut-off temperature so that said heat generating means generates heat for melting said fusible element thereby disconnecting said power source from said electrical resistance heater.

4. The apparatus of claim 3 wherein said melting means, heated by said at least one electrical resistance heater for melting solid thermoplastic material and maintaining said thermoplastic material in a molten state, includes a grid melter and said at least one electrical resistance heater which passes through said grid melter for heating said grid melter to a temperature not less than the melting temperature of said solid thermoplastic material, said melting means further including a reservoir and at least a second electrical resistance heater which is disposed in the walls of said reservoir for heating said reservoir to a temperature not less than the freezing temperature of said molten thermoplastic material, said first thermostat being operative to connect said power source to said at least one electrical resistance heater which passes through said grid melter if the temperature of said molten thermoplastic material is below a preselected grid melter thermostat temperature setting, a third reservoir thermostat for connecting said power source to the electrical resistance heater which is disposed in the walls of said reservoir if the temperature of said molten thermoplastic material is below a preselected reservoir thermostat temperature setting, and said control circuit further including a second fusible element through which said power source is connected to said second electrical resistance heater which is disposed in the walls of said reservoir.

5. The apparatus in claim 3 wherein said second thermostat has normally open contacts which are closed when the temperature of said molten thermoplastic material reaches said substantially higher predetermined shut-off temperature, said contacts when closed causing said heat generating means to be connected to said power source.

6. The apparatus in claim 5 wherein said heat generating means comprises a resistive wire in thermal contact with a ceramic tube within which said fusible element is mounted, said resistive wire being connected to said power source by said contacts when the temperature of said molten thermoplastic material reaches said substantially higher predetermined shut-off temperature.

7. The apparatus in claim 6 wherein said resistive wire is encapsulated within electrically insulative material for isolating said resistive wire from said fusible element.

8. The apparatus in claim 6 wherein an air passage surrounds said fusible element within said ceramic tube 82 for allowing air to circulate over said fusible element, thereby dissipating heat generated internally by current flowing through said fusible element so that nuisance tripping is avoided.

9. The apparatus in claim 3 wherein said preselected first thermostat temperature setting is in the range of 375° F.–425° F. and said substantially higher predetermined shut-off temperature is approximately 500° F.

10. The apparatus of claim 4 wherein said first thermostat temperature setting is in the range of 375° F.–475° F., said third reservoir thermostat temperature setting is in the range of 350° F.–400° F.

* * * * *